United States Patent
Inomoto et al.

(10) Patent No.: US 12,546,946 B2
(45) Date of Patent: Feb. 10, 2026

(54) VIRTUAL IMAGE DISPLAY DEVICE AND OPTICAL UNIT

(71) Applicant: SEIKO EPSON CORPORATION, Tokyo (JP)

(72) Inventors: Katsutoshi Inomoto, Shiojiri (JP); Mitsutaka Ide, Shiojiri (JP); Masayuki Takagi, Azumino (JP); Takashi Tajiri, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 317 days.

(21) Appl. No.: 18/494,765

(22) Filed: Oct. 25, 2023

(65) Prior Publication Data
US 2024/0142707 A1  May 2, 2024

(30) Foreign Application Priority Data
Oct. 28, 2022 (JP) ................ 2022-173084

(51) Int. Cl.
G02B 6/34 (2006.01)
G02B 27/01 (2006.01)

(52) U.S. Cl.
CPC ........... *G02B 6/34* (2013.01); *G02B 27/0172* (2013.01); *G02B 2027/0178* (2013.01)

(58) Field of Classification Search
CPC ...................................................... G02B 6/34
See application file for complete search history.

(56) References Cited

U.S. PATENT DOCUMENTS

2021/0302740 A1   9/2021   Saito
2022/0187599 A1*  6/2022   Lee .................. G02B 1/002

FOREIGN PATENT DOCUMENTS

JP        2021156995       10/2021

* cited by examiner

*Primary Examiner* — Edmond C Lau
(74) *Attorney, Agent, or Firm* — JCIPRNET

(57) ABSTRACT

A virtual image display device includes a display panel being a display element configured to emit image light, a light-guiding member including a first total reflection surface and a second total reflection surface, a first diffraction element being provided on a light incidence side in association with the light-guiding member, a second diffraction element being provided on a light emission side in association with the light-guiding member, and a stray light suppression filter being provided on an external side of an image extraction part provided with the second diffraction element and being configured to limit passage of diffracted light from the second diffraction element.

12 Claims, 12 Drawing Sheets

VIRTUAL IMAGE DISPLAY DEVICE AND OPTICAL UNIT

The present application is based on, and claims priority from JP Application Serial Number 2022-173084, filed Oct. 28, 2022, the disclosure of which is hereby incorporated by reference herein in its entirety.

BACKGROUND

1. Technical Field

The present disclosure relates to a virtual image display device and an optical unit that enable observation of a virtual image, more particularly to a virtual image display device that utilizes diffraction and light guiding.

2. Related Art

There is publicly known a display device that enables observation of a virtual image, the display device including a light-guiding member on which image light emitted from an image light generation device is incident, a first diffraction element being provided on an incidence side of the light-guiding member and having positive power, a second diffraction element being provided on an emission side of the light-guiding member and having positive power, and a mirror being provided to an end of the light-guiding member on the incidence side and having positive power, wherein the image light passing through the first diffraction element is reflected at the mirror, and propagates in the light-guiding member, and the image light incident on the second diffraction element is deflected by the second diffraction element, and forms an emission pupil (JP-A-2021-156995).

The display device as illustrated in JP-A-2021-156995 described above has a risk that a component other than the image light diffracted toward the emission pupil by the second diffraction element leaks to the outside. In particular, when a diffraction grating is used as the diffraction element, a significant proportion of the image light leaks to the outside, and an image is easily viewed from the outside.

SUMMARY

A virtual image display device according to one aspect of the present disclosure includes a display element configured to emit image light, a light-guiding member including a first total reflection surface and a second total reflection surface, a first diffraction element being provided on a light incidence side in association with the light-guiding member, a second diffraction element being provided on a light emission side in association with the light-guiding member, and a stray light suppression filter being provided on an external side of an image extraction part provided with the second diffraction element and being configured to limit passage of diffracted light from the second diffraction element.

DESCRIPTION OF EMBODIMENTS

First Exemplary Embodiment

A first exemplary embodiment of a virtual image display device according to the present disclosure is described below in detail with reference to FIG. 1 and the like.

Figure 1:
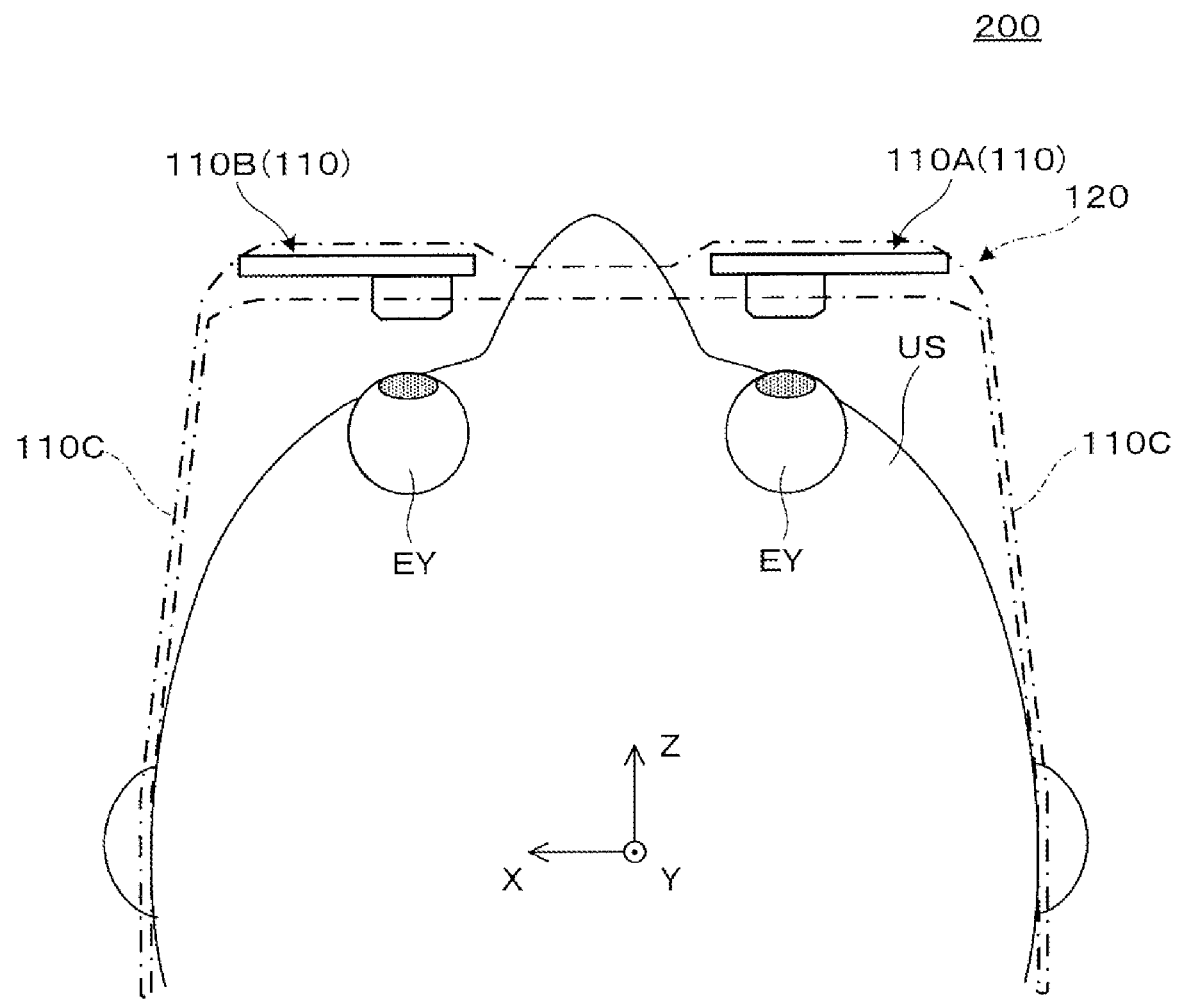
FIG. 1 is a plan view illustrating a worn state of an HMD incorporating a virtual image display device.

FIG. 1 is a diagram illustrating a mounted state of a head-mounted display (hereinafter, also referred to as an "HMD") 200, and the HMD 200 allows an observer or wearer US who is wearing the HMD 200 to recognize an image as a virtual image. In FIG. 1 and the like, X, Y, and Z indicate an orthogonal coordinate system, a +X direction corresponds to a lateral direction in which both eyes EY of the observer or wearer US wearing the HMD 200 or a virtual image display device 110 are aligned, a +Y direction corresponds to an upward direction orthogonal to the lateral direction in which the both eyes EY are aligned for the wearer US, and a +Z direction corresponds to a forward or front direction for the wearer US. The ±Y directions are parallel to the vertical axis or the vertical direction.

The HMD 200 includes a virtual image display device 110A for the right eye, a virtual image display device 110B for the left eye, and a support device 120 that includes a pair of temples 110C and support the pair of virtual image display devices 110A and 110B. The first virtual image display device 110A is disposed to cover the front, that is, the +Z side, of the right eye EY of the wearer US and the second virtual image display device 110B is arranged to cover the +Z side of the left eye EY of the wearer US. The second virtual image display device 110B has a structure obtained by horizontally reversing the optical structure of the first virtual image display device 110A with respect to the +X direction. The first virtual image display device 110A is mainly described below.

Figure 2:
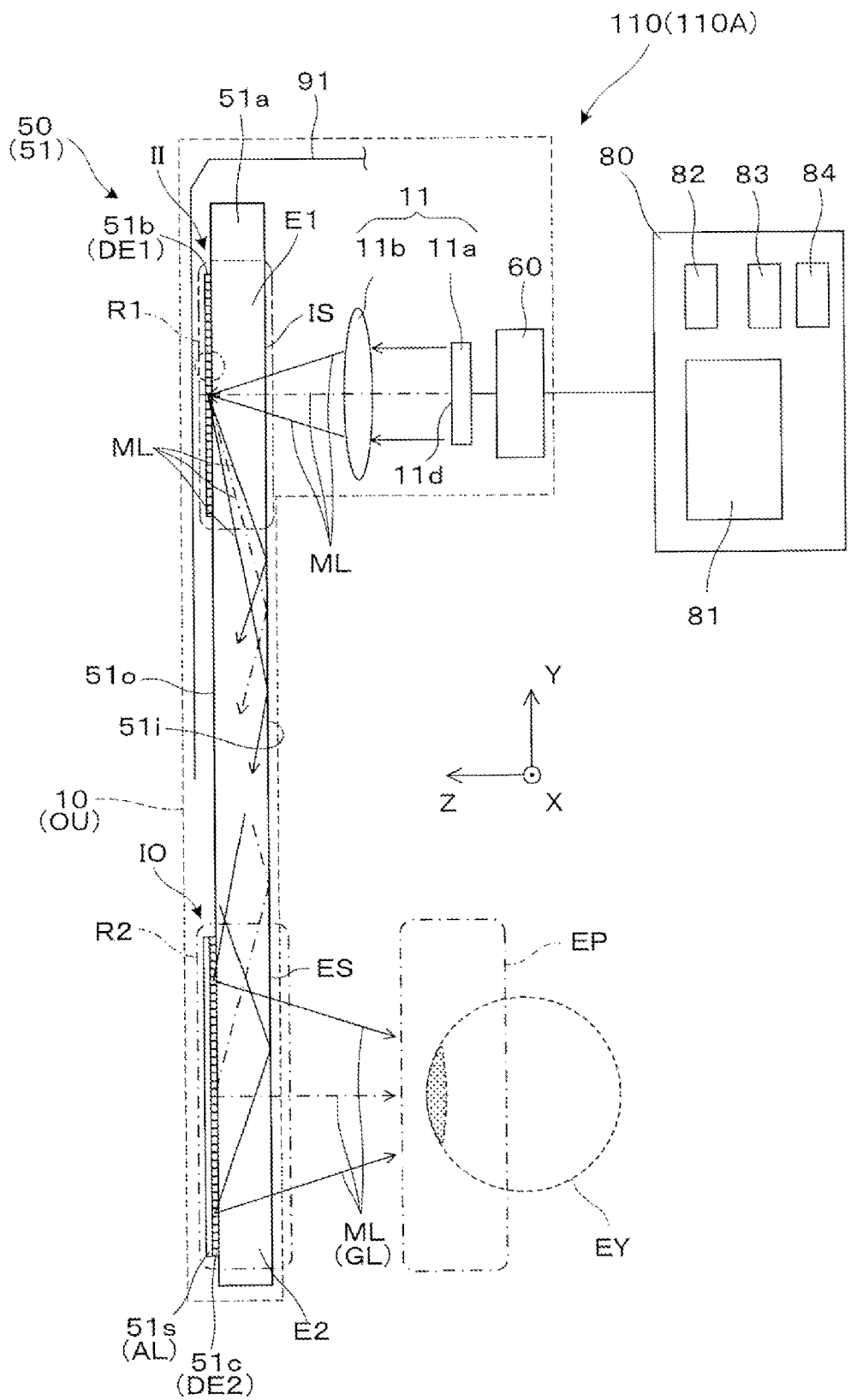
FIG. 2 is a side cross-sectional view of the virtual image display device of a first exemplary embodiment.

With reference to FIG. 2, the first virtual image display device 110A is described. The virtual image display device 110A illustrated in FIG. 2 includes a projection device 10 and a control device 80. The projection device 10 displays a virtual image on the eye EY. Note that the virtual image display device 110A is capable of forming a virtual image with image light having any wavelength in the visible range (specifically, a wavelength from 450 nm to 650 nm), partially transmitting external light in the visible range, and displaying a virtual image with an external image as a background. That is, the virtual image display device 110A is a see-through virtual image display device.

The projection device 10 is an optical unit OU, and includes an image light generation device 11 that is an optical unit emits image light ML, a light-guiding optical system 50 that emits the image light ML in the visible range as display light GL, and a drive circuit 60 that operates the image light generation device 11. The image light generation device 11 includes a display panel 11a and a collimator lens 11b. The image light generation device 11 is arranged on an eye position EP side, that is, on the −Z side, of the light-guiding optical system 50. The light-guiding optical system 50 includes a diffraction light-guiding member 51 extending substantially parallel to an XY plane. For example, the diffraction light-guiding member 51 enables color display in three colors including R, G, and B, and includes a light-guiding member 51a, an incidence diffraction layer 51b, an emission diffraction layer 51c, and a stray light suppression filter 51s. The incidence diffraction layer 51b is a first diffraction element DE1 of a reflection type that is provided in association with an incidence region R1 on one end side of the light-guiding member 51a. The incidence diffraction layer 51b deflects the image light ML, which is emitted from the image light generation device 11 and passes through the light-guiding member 51a of the diffraction light-guiding member 51, at the time of reflection, and establishes a state in which the light can be guided inside the light-guiding member 51a. Further, the emission diffraction layer 51c is a second diffraction element DE2 of a reflection type that is provided in association with an emission region R2 on the other end side of the light-guiding member 51a. The emission diffraction layer 51c deflects the image light ML, which is guided inside the light-guiding member 51a, at the time of reflection, causes the image light ML to pass through the light-guiding member 51a, and emits the image light ML to the outside where the eye EY is located. The stray light suppression filter 51s suppresses leakage of the image light ML to the external side of the light-guiding optical system 50, that is, generation of stray light on the external side. In other words, the stray light suppression filter 51s prevents the stray light, which is a component of the image light ML emitted frontward from the emission diffraction layer 51c, from being emitted and being observed as eye glow. Here, eye glow indicates such a phenomenon that the image light ML leaks out in a part in front of the eye (an image extraction part IO described later) corresponding to the eye EY in the light-guiding optical system 50 and the above-mentioned part in front of the eye releases the image light ML to the outside. Specifically, the stray light suppression filter 51s is an angle control filter AL, and limits transmission of light propagating in a direction that is inclined at a predetermined extent or more with respect to the front direction, that is, the +Z direction. The drive circuit 60 executes signal processing under the control of the control device 80 to cause the display panel 11a to perform a display operation. The projection device 10 or the optical unit OU guides the image light, which generated by the display panel 11a, as the display light GL to the eye EY of the wearer US, thereby allowing the wearer US to visually recognize the virtual image.

In the projection device 10, a cover 91 having a light shielding property covers the incidence region R1 provided with the incidence diffraction layer 51b and the drive circuit 60. With this, leakage of the image light ML from the incidence diffraction layer 51b and leakage of stray light, which is generated by the image light generation device 11, to the outside are prevented. Meanwhile, the cover 91 exposes the emission region R2 provided with the emission diffraction layer 51c to the outside, and enables incidence of the external light at the eye position EP. With this, the external image can be observed.

Hereinafter, the image light generation device 11 is described in more detail. In the image light generation device 11, the display panel 11a is a display element or a display device that emits the image light ML to form an image corresponding to a virtual image. Specifically, the display panel 11a is a light emitting element array display of various types, such as an organic electro-luminescence (EL), an inorganic EL, or an LED, and forms a color still image or moving image on a two-dimensional display surface 11d. The display panel 11a is not limited to a self-luminous image light generating device and may be made of an LCD or other light modulation element and form an image by illuminating the light modulation element with a light source such as a backlight. As the display panel 11a, a liquid crystal on silicon (LCOS) (trade name), a digital micromirror device, or the like can be used instead of an LCD.

The display panel 11a may be replaced with a combination of a laser light source and a scanning device, which is omitted in illustration. The laser light source is a light source for a single wavelength, and is capable of relatively increasing a diffraction efficiency at the diffraction light-guiding member 51 and relatively improves accuracy of angle selectivity of the stray light suppression filter 51s, which is described later.

The collimator lens 11b is a projection optical system including a lens for collimating incident light. The collimator lens 11b collimates the image light ML emitted from the display surface 11d of the display panel 11a such that the image light ML has a predetermined light beam width, and emits the collimated image light ML toward the incidence diffraction layer 51b provided to the diffraction light-guiding member 51 in a state with an inclination angle corresponding to each pixel position. The collimator lens 11b includes one or more lens elements formed of a resin or glass, and may include a reflection mirror. The optical surface of the optical element constituting the collimator lens 11b may be any one of a spherical surface, an aspherical surface, and a free form surface.

In the diffraction light-guiding member 51 of the light-guiding optical system 50, the light-guiding member 51a is a member formed of a parallel flat plate, and has a first total reflection surface 51i and a second total reflection surface 51o that form a pair of flat surfaces extending parallel to the XY plane. The extension direction of the light-guiding member 51a is the ±Y direction. Here, the extension direction is a direction in which the light-guiding member 51a mainly extends, and corresponds to a direction from an incidence surface IS to an emission surface ES of the light-guiding member 51a. In the diffraction light-guiding member 51, the incidence surface IS being a part of the first total reflection surface 51i is provided on the eye EY side, that is, the −Z side of the light-guiding member 51a, in the upper region or the incidence region R1, that is, the region on the +Y side. In the diffraction light-guiding member 51, the emittance surface ES being a part of the first total reflection surface 51i is provided on the eye EY side, that is, the −Z side of the light-guiding member 51a, in the lower region or the emission region R2, that is, the region on the −Y side. In the incidence region R1 of the diffraction light-guiding member 51, the incidence diffraction layer 51b is provided as a structure facing the incidence surface IS on the opposite side of the eye EY, that is, the +Z side. Further, in the incidence region R2 of the diffraction light-guiding member 51, the emission diffraction layer 51c is provided as a structure facing the emission surface ES on the opposite side of the eye EY, that is, the +Z side. The total reflection surfaces 51i and 51o forming the pair of flat surfaces of the light-guiding member 51a totally reflect and guide the image light ML guided into the light-guiding member 51a via the incidence diffraction layer 51b, and guide the image light ML with almost no loss. For example, the light-guiding member 51a has a thickness of approximately 1 mm to 2 mm, and is made of a resin or glass having high optical transparency. Surface accuracy of glass can be easily secured. In view of this, glass is suitable for the material of the light-guiding member 51a.

The incidence diffraction layer 51b is formed in a rectangular area parallel to the XY plane on the outer side opposite to the eye EY at a first end E1 of the light-guiding member 51a that faces the collimator lens 11b. The incidence diffraction layer 51b and the first end E1 are collectively referred to as an image capturing part II. The incidence diffraction layer 51b couples the image light ML, which is emitted from the display surface 11d of the display panel 11a via the collimator lens 11b, to the inside of the light-guiding member 51a. The incidence diffraction layer 51b is the first diffraction element DE1. The incidence diffraction layer (first diffraction element) 51b may be formed integrally with the light-guiding member 51a. Alternatively, the incidence diffraction layer 51b may be formed separately from the light-guiding member 51a, and may be coupled to or adhere to the second total reflection surface 51O of the light-guiding member 51a. The incidence diffraction layer 51b folds the image light ML incident thereon via the incidence surface IS by diffraction so that the image light ML propagates inside the light-guiding member 51a. In the present exemplary embodiment, for example, the incidence diffraction layer 51b is a surface relief diffraction grating, more specifically, a diffraction optical element produced by nanoimprinting. The diffraction optical element produced by nanoimprinting is obtained by forming fine irregularities on a surface of the material that transmits the image light ML and providing a predetermined optical path difference between adjacent regions, and performs target diffraction at the time of reflecting the image light ML. The incidence diffraction layer 51b diffracts the image light ML having a plurality of wavelengths, that is, RGB light separately. The incidence diffraction layer 51b may perform target diffraction with respect to the three colors R, G, and B in a plurality of layers, instead of performing target diffraction with respect to the three colors R, G, and B in a single layer. The incidence diffraction layer 51b is not limited to the surface relief diffraction grating, but may be an optical element having a diffraction function, such as a volume hologram, that is, a diffraction element. The incidence diffraction layer 51b includes a large a large number of protrusions or grooves linearly extending in the horizontal X direction, and is formed with a pattern that is periodic in the vertical Y direction. The grating period (pitch) and grating height of the pattern formed on the incidence diffraction layer 51b are constant. The grating period of this pattern is set to make the angle of reflection or the angle of incidence in the light-guiding member 51a greater than a critical angle determined by the refractive index of the light-guiding member 51a such that the image light ML propagates in the light-guiding member 51a by total reflection. Note that the incidence diffraction layer 51b is not limited to one having periodic concavities and convexities exposed on the surface, and may be one having an embedded interface corresponding to periodic concavities and convexities.

The emission diffraction layer 51c is positioned on the −Y side, that is, on the lower side of the incidence diffraction layer 51b. The emission diffraction layer 51c is formed in a rectangular area parallel to the XY plane on the outer side opposite to the eye EY at a second end E2 of the light-guiding member 51a that faces the eye position EP. The emission diffraction layer 51c and the second end E2 are collectively referred to as the image extraction part IO. The emission diffraction layer 51c extracts, to the outside of the light-guiding member 51a, the image light ML as a whole advancing in the −Y direction in the light-guiding member 51a. The emission diffraction layer 51c is the second diffraction element DE2. The emission diffraction layer 51c or the second diffraction element DE2 may be formed integrally with the light-guiding member 51a. Alternatively, the emission diffraction layer 51c or the second diffraction element DE2 may be formed separately from the light-guiding member 51a, and may be coupled to or adhere to the second total reflection surface 51O of the light-guiding member 51a. When the image light ML is reflected at the total reflection surfaces 51i and 51O of the light-guiding member 51a and propagate, the emission diffraction layer 51c folds the image light ML by diffraction at a certain location, and restores angle information before incidence on the incidence diffraction layer 51b. In the present exemplary embodiment, for example, the emission diffraction layer 51c is a surface relief diffraction grating, more specifically, a diffraction optical element produced by nanoimprinting. The emission diffraction layer 51c is not limited to the surface relief diffraction grating, but may be an optical element having a diffraction function, such as a volume hologram, that is, a diffraction element. The emission diffraction layer 51c includes a large a large number of protrusions or grooves linearly extending in the horizontal X direction, and is formed with a pattern that is periodic in the vertical Y direction. The grating period (pitch) and grating height of the pattern formed on the emission diffraction layer 51c are constant. The grating period of this pattern in the Y direction is caused to match with the grating period of the incidence diffraction layer 51b in the Y direction. Note that the emission diffraction layer 51c is not limited to one having periodic concavities and convexities exposed on the surface, and may be one having an embedded interface corresponding to periodic concavities and convexities.

The stray light suppression filter 51s is arranged on the outer side of the emission diffraction layer 51c, and has substantially the same shape as the emission diffraction layer 51c. The stray light suppression filter 51s may adhere to the emission diffraction layer 51c, or may be arranged away from the emission diffraction layer 51c via a support member.

Figure 3:
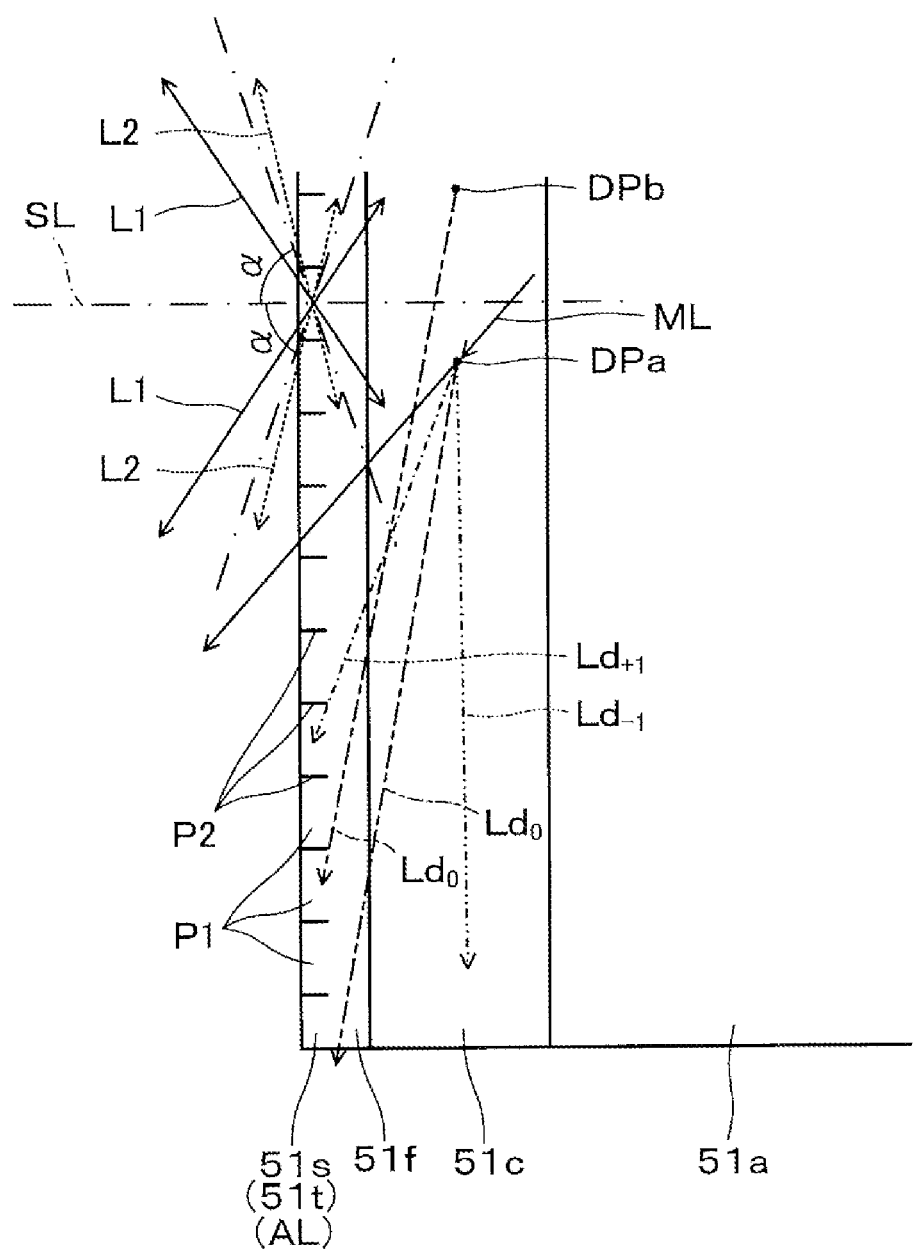
FIG. 3 is an enlarged side cross-sectional view illustrating a function of stray light suppression filter.

With reference to FIG. 3, the stray light suppression filter 51s is a light transmitting member being a flat plate and having a light shielding property depending on an inclination angle with respect to the vertical Y direction. Specifically, the stray light suppression filter 51s is an angle-limiting filter (angle control filter) AL, and includes a light shielding layer 51t. When the inclination angle or the incidence angle with respect to the vertical Y direction exceeds a critical value, transmittance of the light shielding layer 51t is approximately zero. In the light shielding layer 51t, a light transmitting part P1 and a light shielding part P2 are alternately arranged in a constant period with respect to the vertical Y direction, and the light transmitting part P1 and the light shielding part P2 are linearly extend uniformly with respect to the horizontal X direction. In other words, the light shielding layer 51t has a structure in which the light shielding part P2 is embedded in the flat plate having optical transparency. Each of the light shielding layers 51t is a member that is reduced in thickness in the Y direction and corresponds to a louver of blinds. When the diffraction light-guiding member 51 is projected on the YZ plane and is observed, the light shielding layer 51*t* transmits a light beam L1 at an angle less than a predetermined angle α (specifically, for example, 70 degrees) with respect to a reference line SL extending in a direction vertical to the stray light suppression filter 51*s*, and blocks a light beam L2 at an angle equal to or greater than the predetermined angle α (specifically, for example, 70 degrees) with respect to the reference line SL. In other words, when the external light OL is at an angle equal to or less than the predetermined angle α with respect to the reference line SL on the YZ plane along the drawings sheet, the external light OL passes through the stray light suppression filter 51*s* and the like to enable observation of the external image. When the angle of view of the virtual image display device 110A is equal to or less than 2α, the external image is superposed on the virtual image correspondingly to the positions of the corners thereof to enable observation of the virtual image. However, some components of the external light OL that are equal to or less than the predetermined angle α with respect to the reference line SL but are still close to the predetermined angle α are partially blocked, and luminance thereof tends to be lowered. Thus, light extinction may be caused for the external image in the periphery of the visual field.

The image light ML passing through the emission diffraction layer 51*c* at a specific focus point DPa being an intermediate point in the thickness direction of the emission diffraction layer 51*c* is examined. For the transmitted light of the image light ML that is diffracted by the emission diffraction layer 51*c*, inclination of +1-order diffracted light $Ld_{+1}$ with respect to the reference line SL is equal to or greater than the predetermined angle α, and the stray light suppression filter 51*s* blocks the +1-order diffracted light $Ld_{+1}$. Note that inclination of 0-order diffracted light $Ld_0$ with respect to the reference line SL is also equal to or greater than the predetermined angle α. However, the 0-order diffracted light $Ld_0$ does not advance toward the light shielding layer 51*t*. However, the stray light suppression filter 51*s* blocks the 0-order diffracted light $Ld_0$ of the image light ML passing through at a focus point DPb close to the +Y side. The −1-order diffracted light $Ld_{-1}$ from the focus point DPa has inclination with respect to the reference line SL that is equal to or greater than the predetermined angle α. However, the −1-order diffracted light $Ld_{-1}$ does not advance toward the stray light suppression filter 51*s*. The −1-order diffracted light $Ld_{-1}$ from the focus point DPa advances in a direction close to the −Y direction, and does not leak to the outside directly.

Although the description is omitted above, the stray light suppression filter 51*s* blocks +2-order diffracted light of the transmitted light diffracted by the emission diffraction layer 51*c* when inclination thereof with respect to the reference line SL is equal to or greater than the predetermined angle α. Meanwhile, when inclination of the +2-order diffracted light with respect to the reference line SL is less than the predetermined angle α, the +2-order diffracted light is not blocked by the stray light suppression filter 51*s*, and part thereof passes through the stray light suppression filter 51*s*. However, intensity of the +2-order diffracted light is significantly lower than intensity of the +1-order diffracted light, and hence does not cause significant eye glow.

Guidance of the image light ML and formation of a virtual image using the diffraction light-guiding member 51 are described below. The display panel 11*a* forms a still image or a moving image in colors or in a specific color (for example, green) on the two-dimensional display surface 11*d*. The image light ML from the display surface 11*d* enters the light-guiding member 51*a* through the incidence surface IS via the collimator lens 11*b*. In plan view in the −X direction, the image light ML passing through the light-guiding member 51*a* enters the incidence diffraction layer 51*b* at an angle according to the position of the display surface 11*d* in the Y direction. Then, the incidence diffraction layer 51*b* diffracts the image light ML so that the image light ML is reflected in the angle direction corresponding to the pitch of the pattern formed thereon. The image light ML diffracted by the incidence diffraction layer 51*b* is totally reflected and propagates in the light-guiding member 51*a*, and the image light ML as a whole advances in the −Y direction. The image light ML as a whole propagating in the −Y direction in the light-guiding member 51*a* enters the emission diffraction layer 51*c*. Then, the emission diffraction layer 51*c* diffracts the image light ML so that the image light ML is reflected in the angle direction corresponding to the pitch of the pattern formed thereon. The image light ML diffracted by the emission diffraction layer 51*c* passes through the light-guiding member 51*a*, and is emitted from the emission surface ES to the eye position EP at which the eye EY of the wearer US is arranged or a pupil position. the image light ML emitted from the emission diffraction layer 51*c* reproduces the angular state of emission from the display surface 11*d* with respect to the +Y direction while expanding the pupil size in the +Y direction. In other words, the image light ML passes through the diffraction light-guiding member 51 to expand the vertical pupil size, such that a virtual image formed by the image light ML from the display panel 11*a* can be observed even if the position of the eye EY is significantly displaced vertically.

The control device 80 is a mobile terminal operated by the wearer US, and includes a main control device 81, a storage device 82, an interface device 83, and a communication device 84. The control device 80 includes software for enabling selection of an image to be displayed by the projection device 10, software for changing an image to be displayed by the projection device 10 according to the environment, and the like, as application software operated on a basic program for operating the control device 80 in a software storage unit of the storage device 82.

In the description given above, it is assumed that the incidence diffraction layer 51*b* and the emission diffraction layer 51*c* are surface relief diffraction gratings or volume holograms. Alternatively, the incidence diffraction layer 51*b* and the emission diffraction layer 51*c* may be other diffraction elements. When the emission diffraction layer 51*c* is a volume hologram, the +1-order diffracted light passing through the emission diffraction layer 51*c* is weak as compared to a case of the diffraction optical element produced by nanoimprinting. However, when the stray light suppression filter 51*s* is provided, eye glow can securely be suppressed.

The virtual image display device 110 or the HMD 200 of the first exemplary embodiment described above includes the display panel 11*a* being the display element configured to emit the image light ML, the light-guiding member 51*a* including the first total reflection surface 51*i* and the second total reflection surface 51*o*, the first diffraction element DE1 being provided on the light incidence side in association with the light-guiding member 51*a*, the second diffraction element DE2 being provide on the light emission side in association with the light-guiding member 51*a*, and the stray light suppression filter 51*s* being provided on the external side of the image extraction part IO provided with the second diffraction element DE2 and being configured to limit passage of diffracted light from the second diffraction element DE2. In the virtual image display device 110 or the HMD 200, the stray light suppression filter 51s limits passage of the diffracted light from the second diffraction element DE2. Thus, the image light ML emitted frontward from the second diffraction element DE2 can be prevented from being observed as eye glow. Further, the image light ML emitted frontward from the second diffraction element DE2 can be prevented from being visually recognized as an image by another facing person.

Second Exemplary Embodiment

A virtual image display device according to a second embodiment of the present disclosure is described below. Note that the virtual image display device of the second exemplary embodiment is a partial modification of the virtual image display device of the first exemplary embodiment, and description of common parts is omitted.

Figure 4:
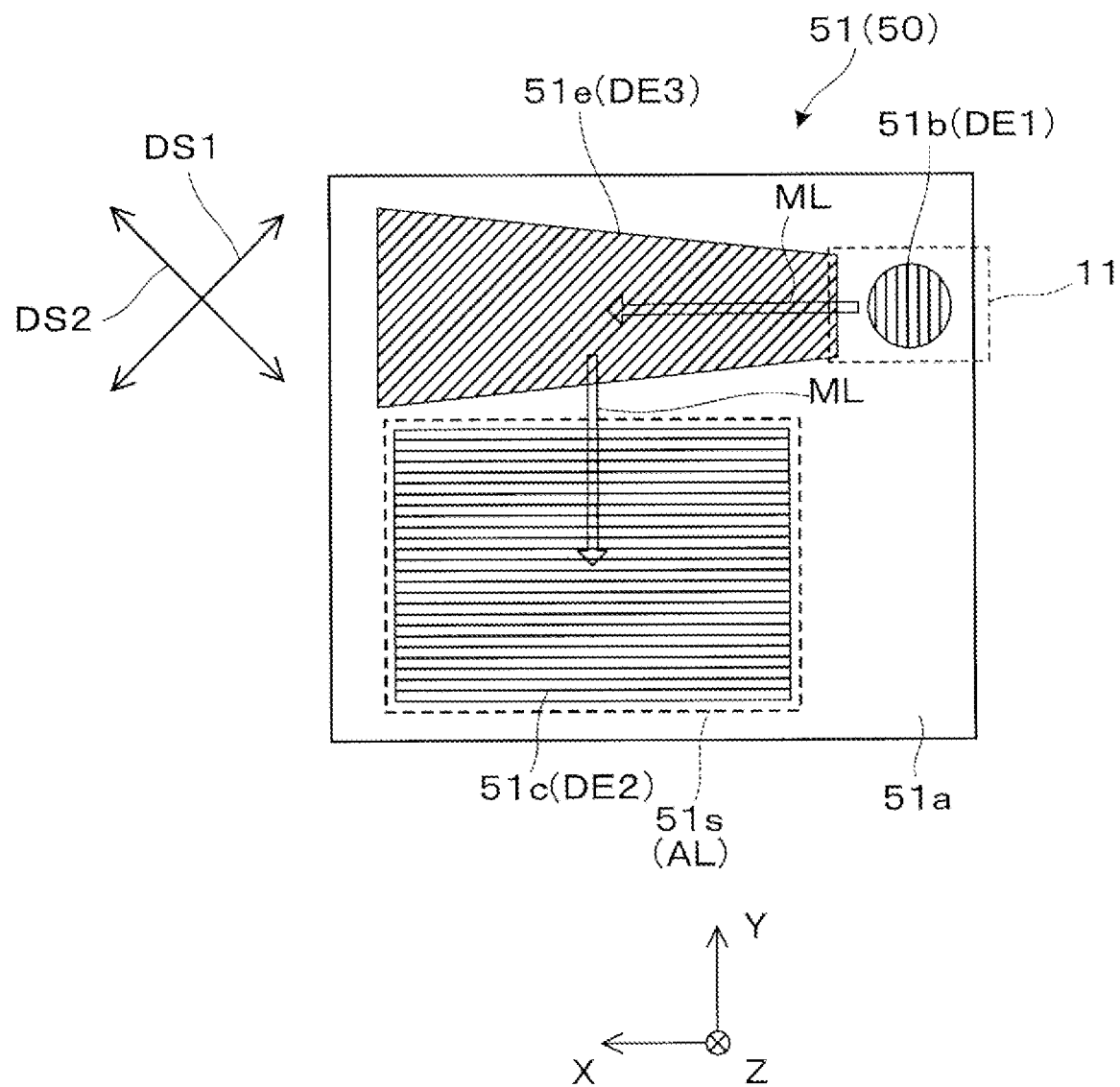
FIG. 4 is a back view illustrating main parts of a virtual image display device of a second exemplary embodiment.

As illustrated in FIG. 4, the diffraction light-guiding member 51 of the light-guiding optical system 50 includes the light-guiding member 51a, the incidence diffraction layer 51b, a pupil expansion grating layer 51e, the emission diffraction layer 51c, and the stray light suppression filter 51s. The incidence diffraction layer 51b is the first diffraction element DE1, and is formed with a diffraction pattern that extends linearly in the vertical Y direction and repeats periodically in the horizontal X direction. The emission diffraction layer 51c is the second diffraction element DE2, and is formed with a diffraction pattern that extends linearly in the horizontal X direction and repeats periodically in the vertically Y direction. The pupil expansion grating layer 51e is a third diffraction element DE3, is provided on the −X side of the incidence diffraction layer 51b, and bends the optical path while maintaining the angle information so that the image light ML, which is guided in the light-guiding member 51 and advances as a whole in the −X direction, advances as a whole in the −Y direction. The third diffraction element DE3 is interposed between the first diffraction element DE1 and the second diffraction element DE2, and guides the image light ML in the direction (−Y direction) intersecting with the diffraction direction of the first diffraction element DE1 (X direction). The pupil expansion grating layer 51e is formed with a diffraction pattern that extends linearly in an oblique direction DS1 parallel to the XY plane and repeats periodically in a direction DS2 parallel to the XY plane and perpendicular to the direction DS1. The direction DS1 is a direction rotated clockwise by 45 degrees with respect to the +Y direction, and is an intermediate direction between the −X direction and the +Y direction. The grating period or the pitch in the X direction and the Y direction of the pattern formed on the pupil expansion grating layer 51e matches with the grating period in the X direction of the pattern formed on the incidence diffraction layer 51b and the grating period in the Y direction of the pattern formed on the emission diffraction layer 51c.

The image light ML from the image light generation device 11 enters the incidence diffraction layer 51b via the light-guiding member 51a, and is diffracted in the angle direction corresponding to the grating period of the pattern formed on the incidence diffraction layer 51b. Then, the image light ML is totally reflected and propagates in the light-guiding member 51a, and advances in the +X direction as a whole. The image light ML propagating in the +X direction in the light-guiding member 51a is diffracted by the pupil expansion grating layer 51e such that its optical path is bent in the −Y direction as a whole and is shifted to a position in the +X direction that reflects the number of reflections before being diffracted by the pupil expansion grating layer 51e. That is, the pupil expansion grating layer 51e has a function of expanding a horizontal pupil size corresponding to a light beam width in the horizontal direction or the X direction with which the image light ML is incident on the eye EY. The image light ML propagating in the −Y direction as a whole in the light-guiding member 51a via the pupil expansion grating layer 51e is diffracted by the emission diffraction layer 51c, and is emitted toward the eye EY. The image light ML emitted from the emission diffraction layer 51c is emitted from the image light generation device 11 with respect to the X direction and the Y direction, and reproduces the angular state before incidence on the diffraction light-guiding member 51 while expanding the pupil size in the X direction and the Y direction. In other words, the diffraction light-guiding member 51 maintains the image information, and expands the pupil size both vertically and horizontally.

Similarly to the first exemplary embodiment, in the present exemplary embodiment, the stray light suppression filter 51s that spreads in the area region substantially the same as the emission diffraction layer 51c is also arranged on the outer side, that is, the +Z side of the emission diffraction layer 51c. The stray light suppression filter 51s functions as the angle control filter AL. When an inclination angle of the diffracted light or the like of the image light ML that passes through the emission diffraction layer 51c and enters the stray light suppression filter 51s is increased at a predetermined extent or more with respect to the vertical Y direction with the front +Z direction as a reference, the stray light suppression filter 51s exerts a light shielding property with respect to the image light ML, and prevents the image light ML from leaking to the outside. In other words, the stray light suppression filter 51s can prevent the +1-order diffracted light and the like with respect to the vertical Y direction, which passes through the emission diffraction layer 51c and advances to the +Z side, from leaking to the outside and being observed as eye glow, or prevents the +1-order diffracted light and the like from being visually recognized as an image by another facing person.

When the stray light suppression filter 51s is a light transmitting member having a light shielding property depending on the angle with respect to the horizontal X direction as well as the vertical Y direction, an effect of suppressing eye glow by the stray light suppression filter 51s can further be enhanced. In order to provide the stray light suppression filter 51s with an angle control property in the vertical direction and the horizontal direction as described above, it is conceived to provide a second light shielding layer having an angle control function with respect to the XZ plane in addition to the first light shielding layer (corresponding to the light shielding layer 51t in FIG. 3) having an angle control function with respect to the YZ plane. The second light shielding layer having an angle limiting function with respect to the XZ plane is obtained by alternately arranging the light transmitting part and the light shielding part in a constant period with respect to the horizontal X direction. The stray light suppression filter 51s is not limited to one obtained by laminating the first light shielding layer and the second light shielding layer with each other, and may be one obtained by integrating the first light shielding layer and the second light shielding layer with each other. In this case, the stray light suppression filter 51s has a structure in which a light shielding part or a louver extending in the X direction or the Y direction is embedded in a light transmitting layer, for example.

Third Exemplary Embodiment

A virtual image display device according to a third exemplary embodiment of the present disclosure is described below. Note that the virtual image display device of the third exemplary embodiment is a partial modification of the virtual image display devices of the first exemplary embodiment and the second exemplary embodiment, and description of common parts is omitted.

Figure 5:
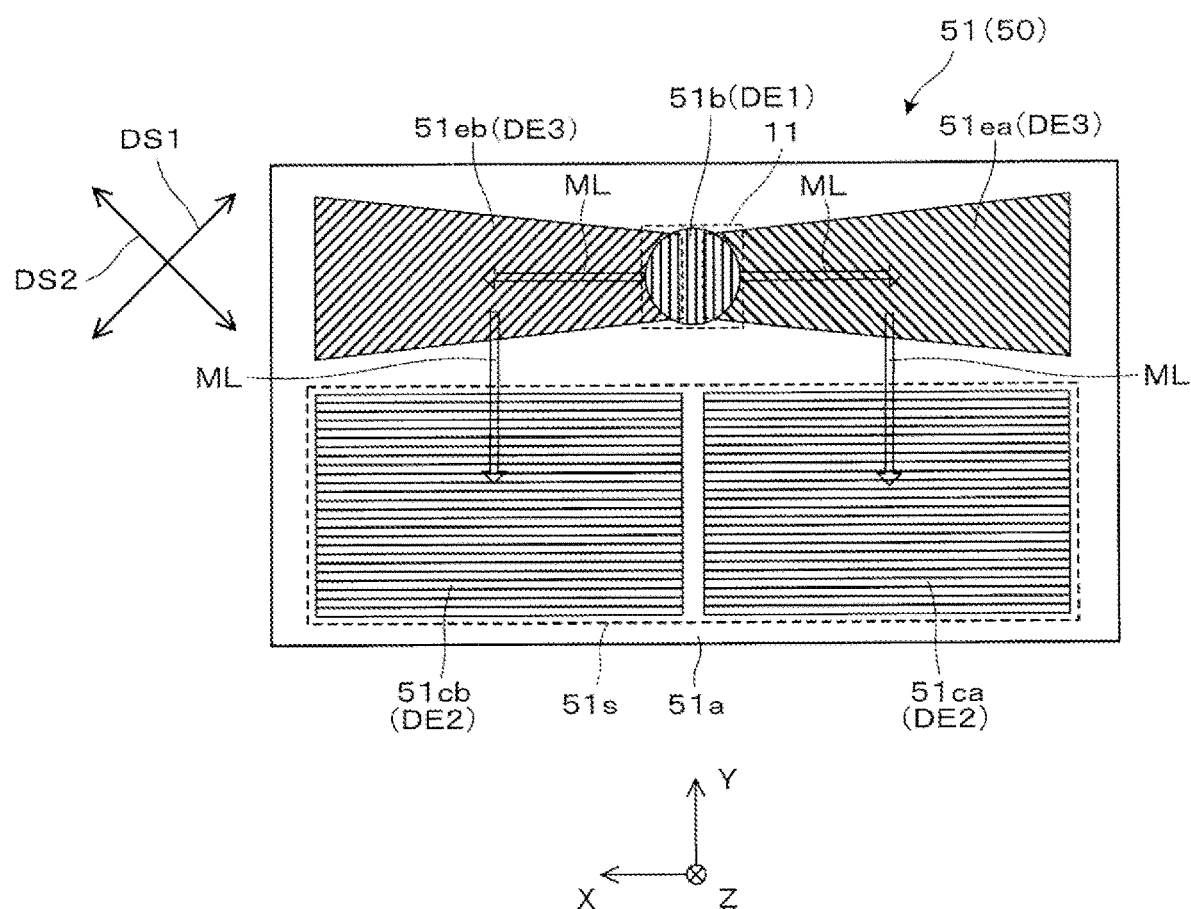
FIG. 5 is a back view illustrating main parts of a virtual image display device of a third exemplary embodiment.

As illustrated in FIG. 5, the diffraction light-guiding member 51 of the light-guiding optical system 50 includes the light-guiding member 51a, the incidence diffraction layer 51b, a first pupil expansion grating layer 51ea, a second pupil expansion grating layer 51eb, a first emission diffraction layer 51ca, a second emission diffraction layer 51cb, and the stray light suppression filter 51s. The incidence diffraction layer 51b is the first diffraction element DE1, and is formed with a diffraction pattern that extends linearly in the vertical Y direction and repeats periodically in the horizontal X direction. The first pupil expansion grating layer 51ea is the third diffraction element DE3, and is formed with a diffraction pattern that extends in a first intermediate direction between the −X direction and the −Y direction and repeats periodically in a first orthogonal direction vertical to the first intermediate direction. The second pupil expansion grating layer 51eb is the third diffraction element DE3, and is formed with a diffraction pattern that extends in a second intermediate direction between the −X direction and the +Y direction (corresponding to the first orthogonal direction of the first intermediate direction) and repeats periodically in a second orthogonal direction vertical to the second intermediate direction. The first emission diffraction layer 51ea is the second diffraction element DE2 arranged in the −Y direction of the first pupil expansion grating layer 51ea, and is formed with a diffraction pattern that extends linearly in the horizontal X direction and repeats periodically in the vertically Y direction. The second emission diffraction layer 51cb is the second diffraction element DE2 arranged in the −Y direction of the second pupil expansion grating layer 51eb, and is formed with a diffraction pattern that extends linearly in the horizontal X direction and repeats periodically in the vertically Y direction.

In the description given above, for example, the incidence diffraction layer 51b is arranged on the opposite side of the first pupil expansion grating layer 51ea and the second pupil expansion grating layer 51eb across the light-guiding member 51a.

The image light ML from the image light generation device 11 enters the incidence diffraction layer 51b, and is diffracted in the angle direction corresponding to the grating period of the pattern formed on the incidence diffraction layer 51b. Then, the image light ML is totally reflected and propagates in the light-guiding member 51a, and advances in the ±X direction as a whole. The image light ML propagating in the +X direction in the light-guiding member 51a via the incidence diffraction layer 51b is diffracted by the first pupil expansion grating layer 51ea such that its optical path is bent in the −Y direction as a whole and is shifted to a position in the +X direction that reflects the number of reflections before being diffracted by the first pupil expansion grating layer 51ea. Meanwhile, the image light ML propagating in the +X direction in the light-guiding member 51a via the incidence diffraction layer 51b is diffracted by the second pupil expansion grating layer 51eb such that its optical path is bent in the −Y direction as a whole and is shifted to a position in the +X direction that reflects the number of reflections before being diffracted by the second pupil expansion grating layer 51eb. The first pupil expansion grating layer 51ea corresponds to angle of view biased in the −X direction, for example, from 0 degrees to +20 degrees with the Z direction as a reference, and the second pupil expansion grating layer 51eb corresponds to an angle of view biased in the +X direction, for example, from −20 degrees to 0 degrees with the Z direction as a reference. The first pupil expansion grating layer 51ea and the second pupil expansion grating layer 51eb expand the horizontal pupil size. The image light ML propagating in the −Y direction as a whole in the light-guiding member 51a via the first pupil expansion grating layer 51ea is diffracted by the first emission diffraction layer 51ea, and is emitted toward the eye EY. Meanwhile, the image light ML propagating in the −Y direction as a whole in the light-guiding member 51a via the second pupil expansion grating layer 51eb is diffracted by the second emission diffraction layer 51cb, and is emitted toward the eye EY. The first emission diffraction layer 51ea and the second emission diffraction layer 51cb expand the vertical pupil size.

Similarly to the first exemplary embodiment and the like, in the present exemplary embodiment, the stray light suppression filter 51s that spreads in the area region substantially the same as the emission diffraction layer 51c is also arranged on the outer side, that is, the +Z side of the emission diffraction layers 51ea and 51cb. The stray light suppression filter 51s functions as the angle control filter AL, and prevents the image light ML from leaking to the outside.

Fourth Exemplary Embodiment

A virtual image display device according to a fourth embodiment of the present disclosure is described below. Note that the virtual image display device of the fourth embodiment is a partial modification of the virtual image display device of the first exemplary embodiment, and description of common parts will be omitted.

Figure 6:
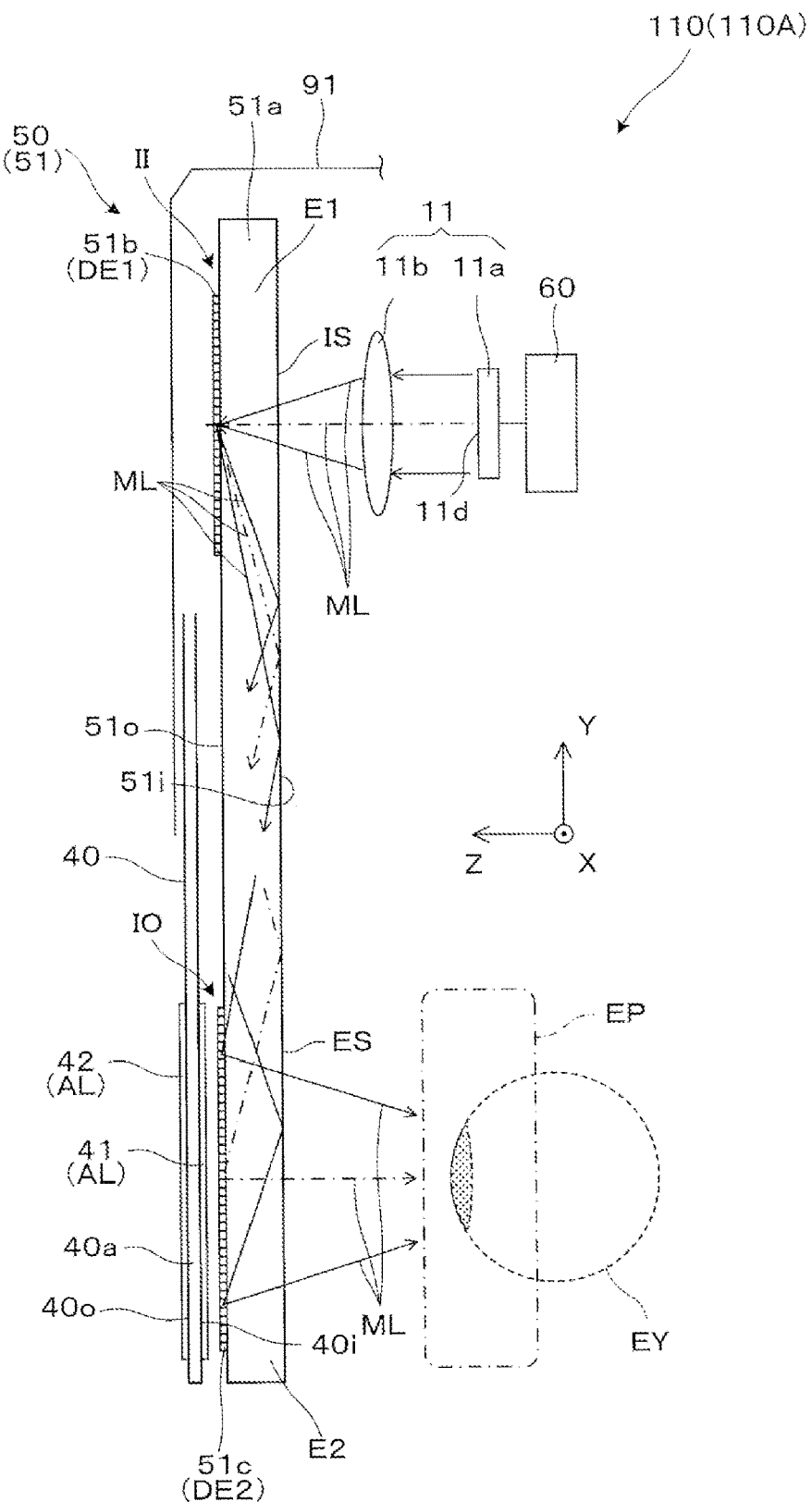
FIG. 6 is a side cross-sectional view illustrating main parts of a virtual image display device of a fourth exemplary embodiment.

FIG. 6 is a cross-sectional view illustrating the structure of the virtual image display device 110 or the HMD 200 of the fourth exemplary embodiment, and the cover member 40 having a thin plate-like shape is arranged on the +Z side being the outer side of the diffraction light-guiding member 51. A first stray light suppression filter 41 adheres to a back surface 40i of a resin base material 40a of the cover member 40 on the eye position EP side. Further, a second stray light suppression filter 42 adheres to a front surface 40o of the base material 40a on the external side. The first stray light suppression filter 41 and the second stray light suppression filter 42 function as the angle control filter AL, and prevent the image light ML from leaking to the outside. Note that, in a case in which the base material 40a of the cover member 40 is made of a resin, when the light-guiding member 51a is made of glass, an effect of scatter prevention can be secured.

Figure 7:
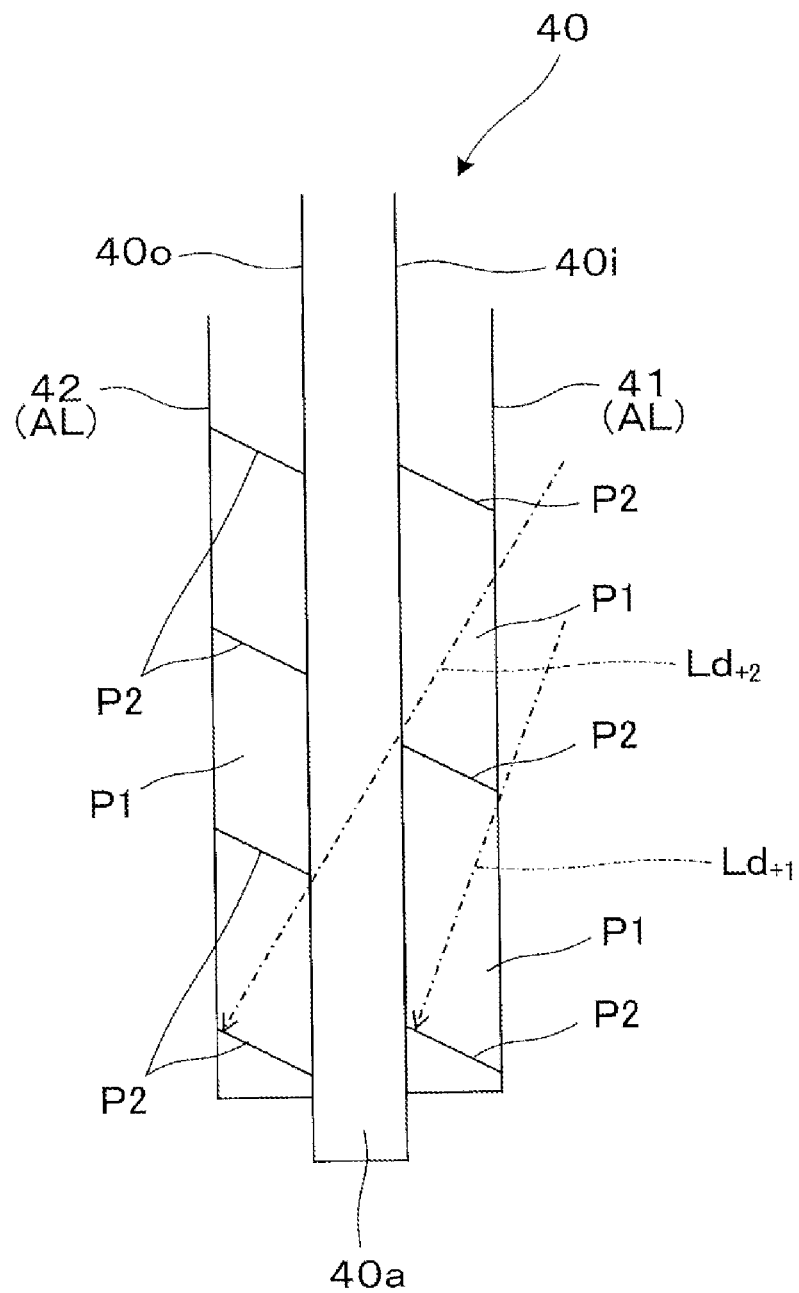
FIG. 7 is a view illustrating a function of a pair of stray light suppression filters illustrated in FIG. 6.

With reference to FIG. 7, in particular, the first stray light suppression filter 41 has a structure similar to that of the stray light suppression filter 51s illustrated in FIG. 3, and is designed to block the +1-order diffracted light $Ld_{+1}$. The second stray light suppression filter 42 is designed to block +2-order diffracted light $Ld_{+2}$.

In the present exemplary embodiment, the second stray light suppression filter 42 provided to the cover member 40 also enables blocking of the +2-order diffracted light $Ld_{+2}$ being high-order light. The first stray light suppression filter 41 and the second stray light suppression filter 42 each correspond to target diffracted light, and prevent increase in amount of blocked external light.

The second stray light suppression filter 42 can be omitted from the cover member 40. In this case, the first stray light suppression filter 41 is not required to adhere to the back surface 40i, and the first stray light suppression filter 41 may adhere to the front surface 40o.

Figure 8:
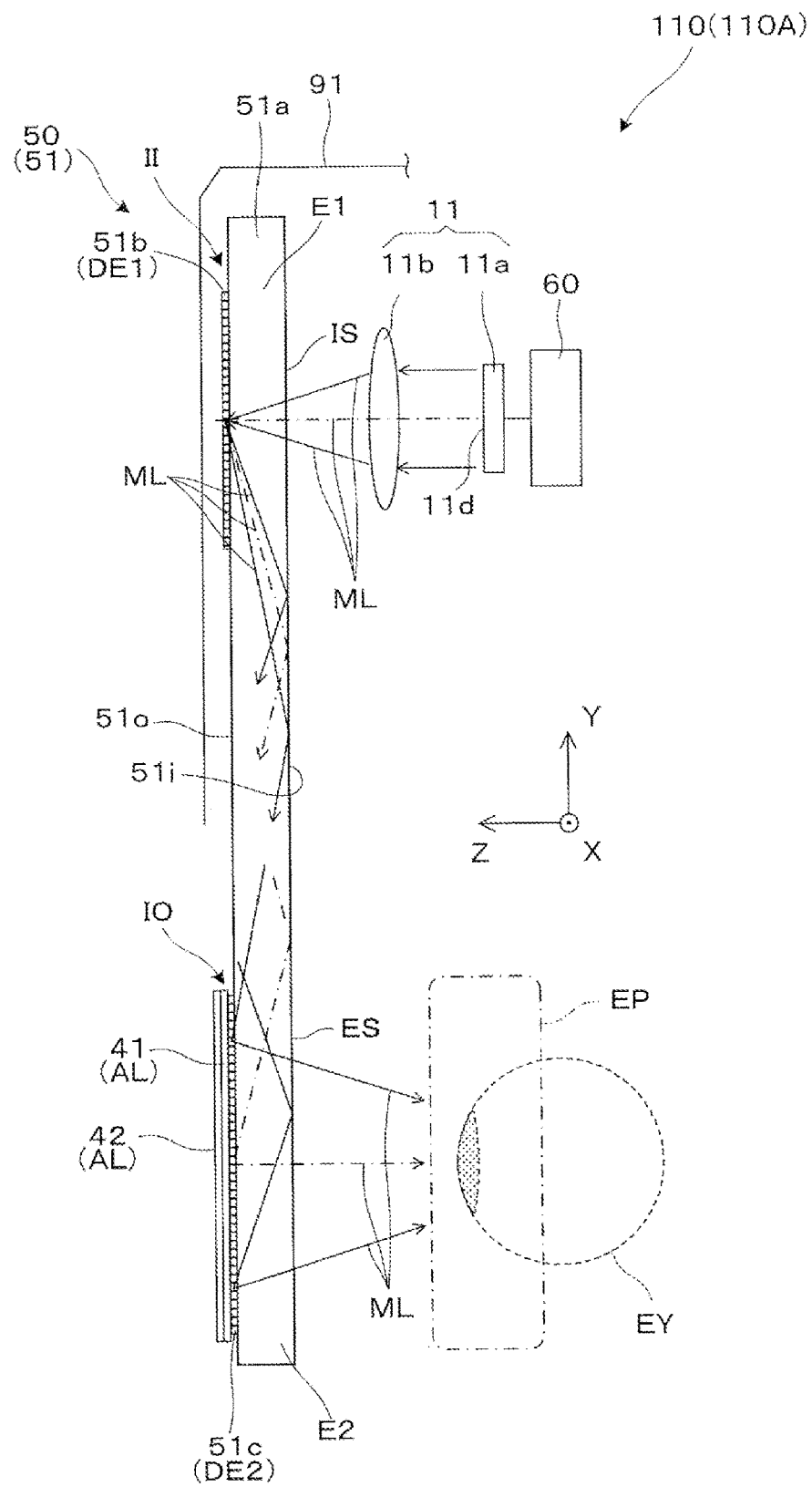
FIG. 8 is a view illustrating a modification example of the virtual image display device illustrated in FIG. 6.

FIG. 8 is a cross-sectional view illustrating a modification example. In this case, the first stray light suppression filter 41 and the second stray light suppression filter 42 adhere to the emission diffraction layer 51c.

Figure 9:
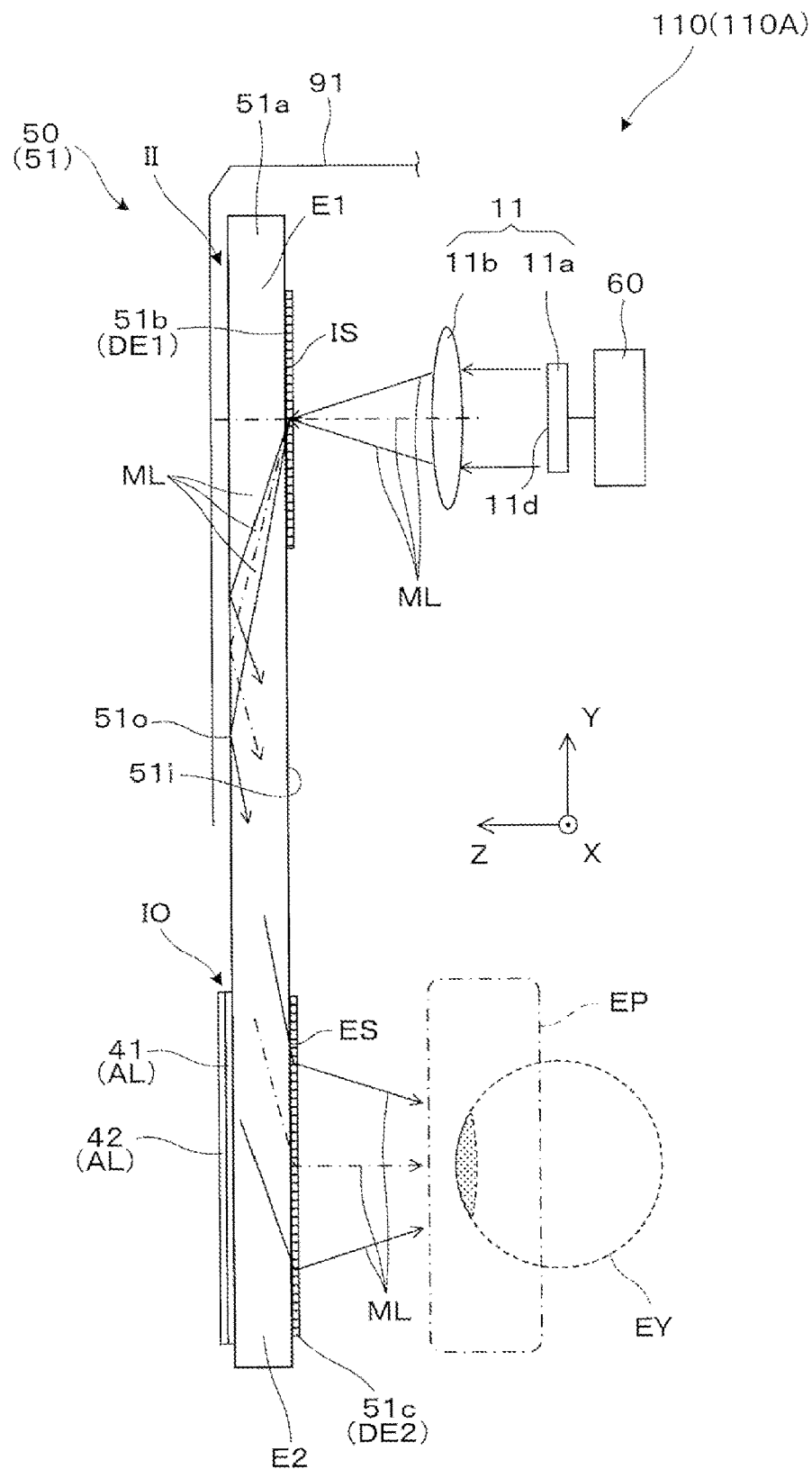
FIG. 9 is a view illustrating another modification example of the virtual image display device illustrated in FIG. 6.

FIG. 9 is a cross-sectional view illustrating another modification example. In this case, the incidence diffraction layer 51b and the emission diffraction layer 51c are formed on the total reflection surface 51i on the inner side of the light-guiding member 51a, and function as diffraction elements of a transmission type. The first stray light suppression filter 41 and the second stray light suppression filter 42 adhere to the total reflection surface 51O on the outer side of the light-guiding member 51a.

Fifth Exemplary Embodiment

A virtual image display device according to a fifth embodiment of the present disclosure is described below. Note that the virtual image display device of the fifth exemplary embodiment is a partial modification of the virtual image display device of the first exemplary embodiment, and description of common parts is omitted.

Figure 10:
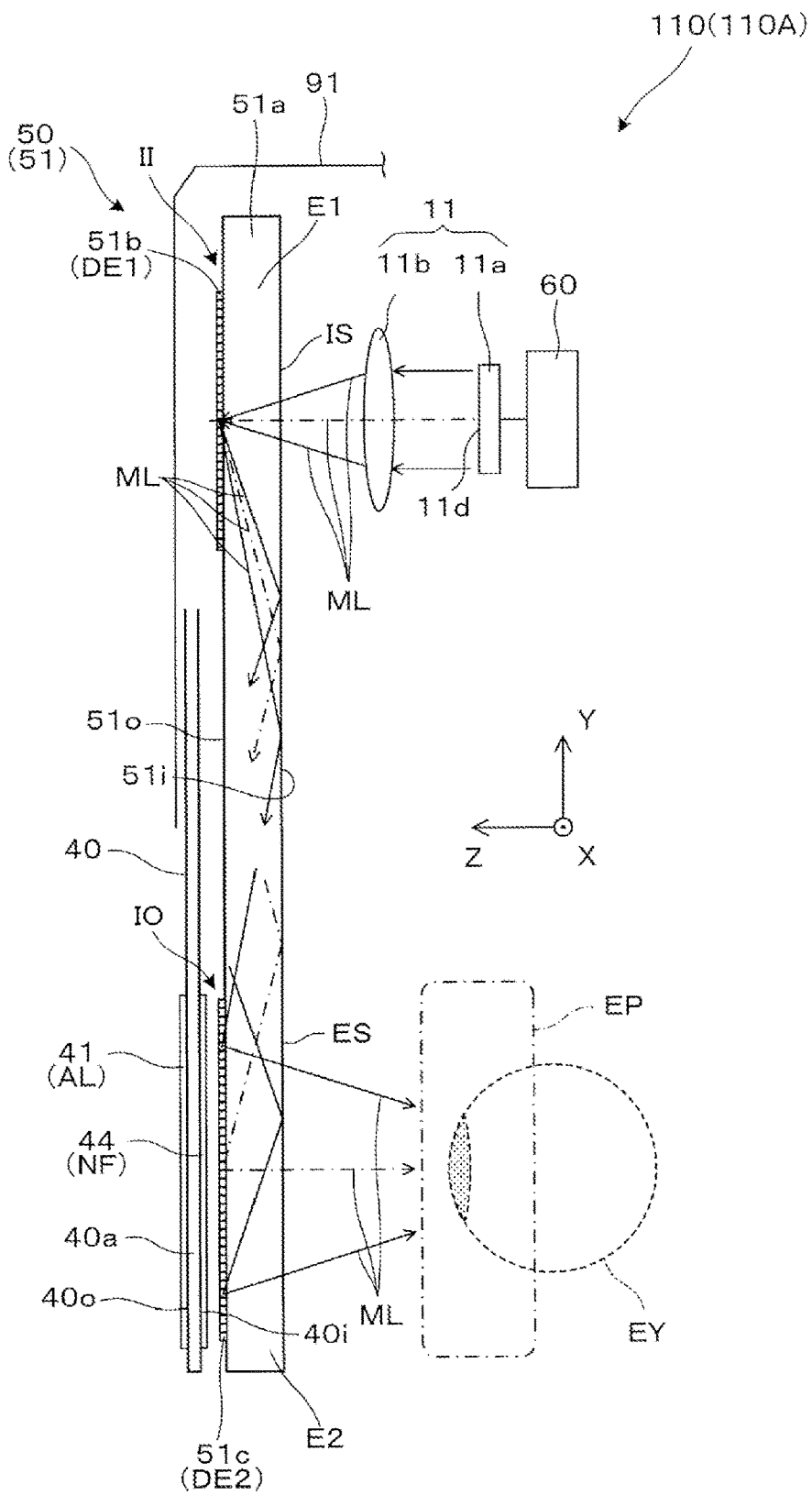
FIG. 10 is a view illustrating main parts of a virtual image display device of a fifth exemplary embodiment.

FIG. 10 is a cross-sectional view illustrating the structure of the virtual image display device 110 or the HMD 200 of the fifth exemplary embodiment. The first stray light suppression filter 41 adheres to the front surface 40o of the base material 40a of the cover member 40 arranged on the outer side of the diffraction light-guiding member 51, an a wavelength cut filter 44 adheres to the back surface 40i of the cover member 40. The wavelength cut filter 44 is a wavelength-limiting filter NF. Specifically, the wavelength cut filter 44 is a notch filter, and prevents the diffracted light from being emitted to the external side of the emission diffraction layer 51c being the second diffraction element DE2. The wavelength-limiting filter NF is a filter that limits passage of diffracted light having a specific wavelength, among diffracted light having a plurality of wavelengths from the emission diffraction layer 51c or the second diffraction element DE2. When a wavelength region of the image light ML emitted from the display panel 11a is wide, the image light ML having a wavelength deviated from a designed target wavelength of the incidence diffraction layer 51b and the emission diffraction layer 51c propagates to the emission diffraction layer 51c via the light-guiding member 51a and the incidence diffraction layer 51b. Thus, the image light ML having a deviated wavelength may pass through the first stray light suppression filter 41, and may be observed as eye glow on the external side. However, eye glow due to the image light ML having a deviated wavelength can be suppressed by providing the wavelength cut filter 44 in an optical path of the image light ML. In other words, for any diffracted light having a specific wavelength deviated from the target wavelength, an effect of suppressing eye glow can be improved.

Figure 11:
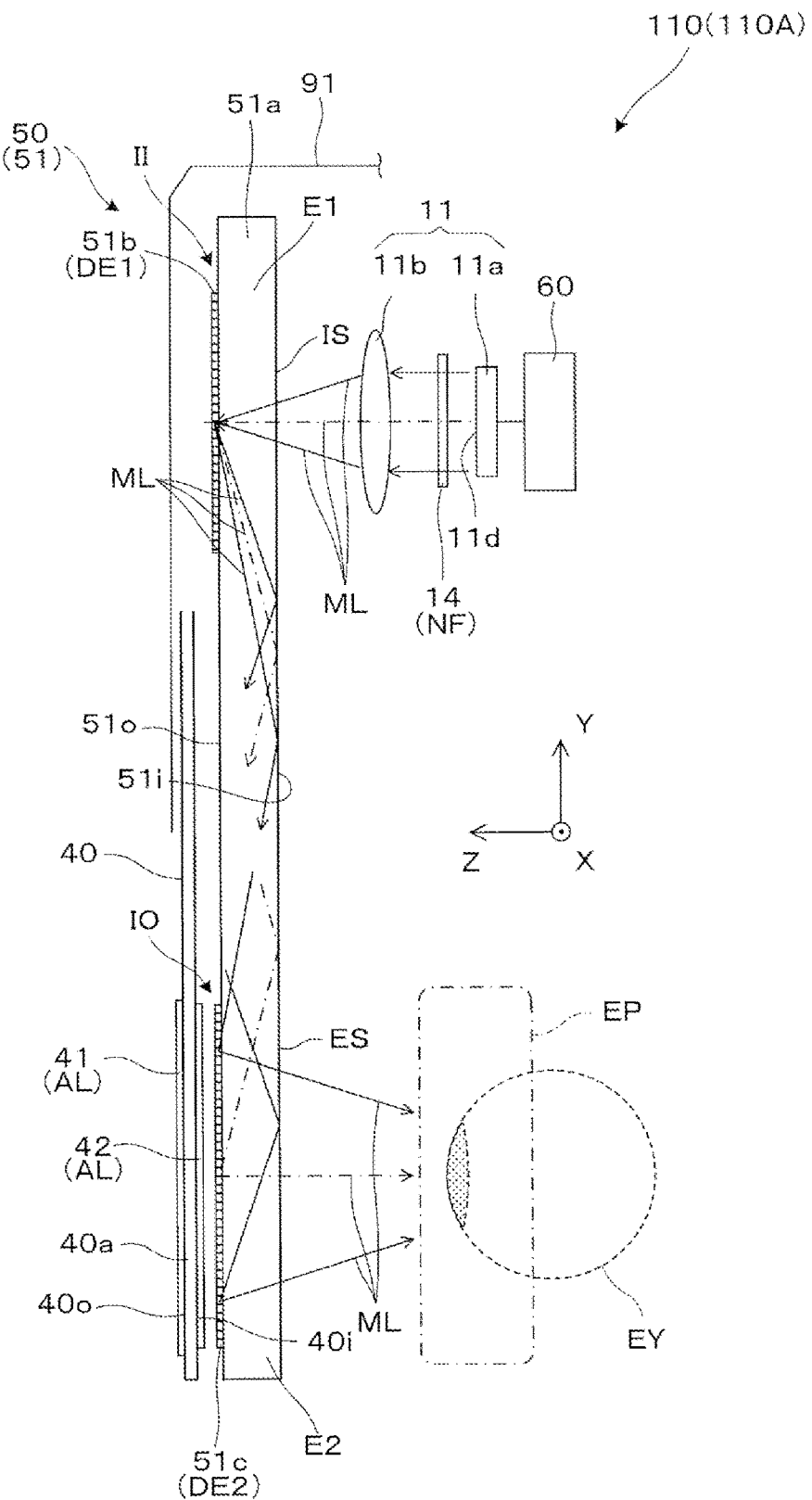
FIG. 11 is a view illustrating a modification example of the virtual image display device illustrated in FIG. 10.

FIG. 11 is a cross-sectional view illustrating a modification example. In this case, a wavelength cut filter 14 is provided between the display panel 11a and the collimator lens 11b. The wavelength cut filter 14 has a function similar to that of the wavelength cut filter 44 illustrated in FIG. 11. In this manner, the wavelength cut filter 44 may be arranged at any position in the optical path from the display panel 11a being the display element to the light emission side of the emission diffraction layer 51c being the second diffraction element DE2.

Sixth Exemplary Embodiment

A virtual image display device according to a sixth embodiment of the present disclosure is described below. Note that the virtual image display device of the sixth exemplary embodiment is a partial modification of the virtual image display device of the first exemplary embodiment, and description of common parts is omitted.

Figure 12:
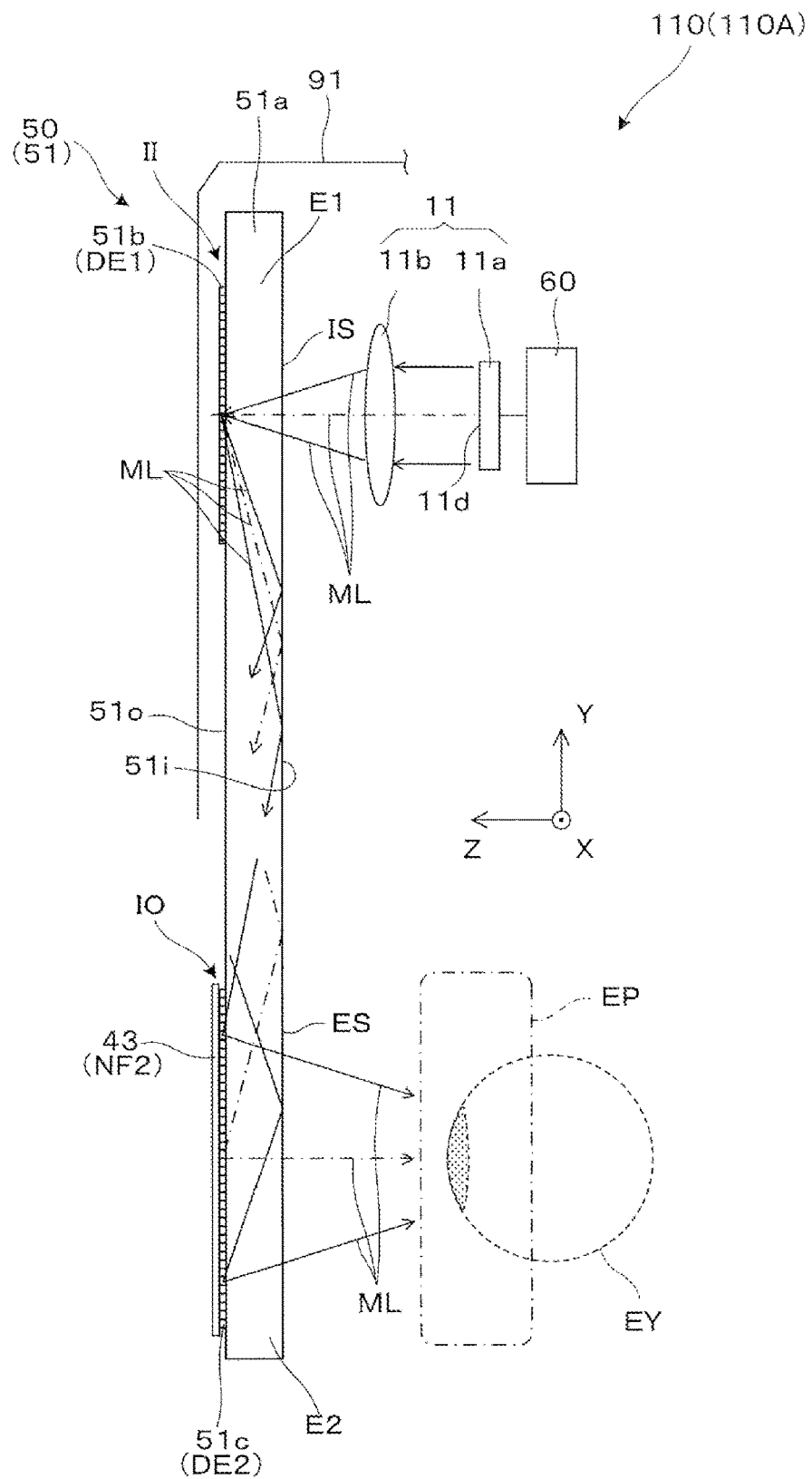
FIG. 12 is a back view illustrating main parts of a virtual image display device of a sixth exemplary embodiment.

In a case of the virtual image display device 110 or the HMD 200 illustrated in FIG. 12, a third stray light suppression filter 43 adheres to the emission diffraction layer 51c. In other words, the third stray light suppression filter 43 is arranged in place of the stray light suppression filter 51s illustrated in FIG. 2 and the like. The third stray light suppression filter 43 is a wavelength-limiting filter NF2 that selectively cuts wavelength components R, G, and B included in the image light ML emitted from the display panel 11a. In this case, the image light ML can be directly and securely prevented from leaking to the external side.

Others

The structures described above are examples and various modifications can be made without departing from the scope capable of achieving the same functions.

The stray light suppression filter 51s is not limited to one having a light shielding property uniformly in the XY plane, and a distribution may be provided to a light shielding property in the XY plane. In the exemplary embodiments described above, the stray light suppression filter 51s is formed within a range covering the emission diffraction layer 51c, but may cover the emission diffraction layer 51c locally.

The stray light suppression filter 51s is not limited to one obtained by periodically arranging the light shielding part P2 extending linearly in the light transmitting part P1, and may be one using a diffraction element.

The first diffraction element DE1 and the second diffraction element DE2 are not limited to ones without power, and may be ones with power. For example, the first diffraction element DE1 can be caused to function as a collimator for coupling the image light ML to the inside of the light-guiding member 51a, and the second diffraction element DE2 can be caused to function as an eye lens for extracting the image light ML, which propagates in the light-guiding member 51a, to the eye position EP.

Although it has been described above that the virtual image display device 110 or the like can be used as an HMD, the present disclosure is not limited thereto and can be applied to various optical devices, for example, a head-up display (HUD).

A virtual image display device in a specific aspect includes a display element configured to emit image light, a light-guiding member including a first total reflection surface and a second total reflection surface, a first diffraction element being provided on a light incidence side in association with the light-guiding member, a second diffraction element being provided on a light emission side in association with the light-guiding member, and a stray light suppression filter being provided on an external side of an image extraction part provided with the second diffraction element and being configured to limit passage of diffracted light from the second diffraction element.

In the virtual image display device described above, the stray light suppression filter limits passage of the diffracted light from the second diffraction element. Thus, the image light emitted frontward from the second diffraction element can be prevented from being observed as eye glow. Further, the image light emitted frontward from the second diffraction element can be prevented from being visually recognized as an image by another facing person.

In a specific aspect, the stray light suppression filter is an angle-limiting filter including a light shielding part arranged repeatedly at a predetermined interval in a flat plate. In this case, with the thin angle-limiting filter, the stray-light suppression filter can be reduced in weight, and efficiency in blocking the diffracted light can be improved.

In a specific aspect, there is included a filter configured to limit passage of diffracted light having a specific wavelength, among diffracted light having a plurality of wavelengths from the second diffraction element. In this case, for the diffracted light having the specific wavelength deviated from the target wavelength, an effect of suppressing eye glow can be improved.

In a specific aspect, the stray light suppression filter includes a plurality of filters configured to limit passage of diffracted light of a plurality of orders from the second diffraction element. In this case, for all the diffracted light having the plurality of orders, an effect of suppressing eye glow can be improved.

In a specific aspect, there is included a light transmission member having a flat plate shape and being arranged on the external side of the image extraction part, and the stray light suppression filter is provided on any one of an external side or an eye position side of the light transmission member. In this case, a degree of freedom of arrangement of the stray light suppression filter can be improved while maintaining the performance of the stray light suppression filter.

In a specific aspect, the light transmission member is made of a resin, and the light-guiding member is made of glass. The light transmission member has a function of protecting the light-guiding member capable of relatively increasing a total reflection angle.

In a specific aspect, the stray light suppression filter is provided on each of the external side and the eye position side of the light transmission member.

In a specific aspect, the first diffraction element and the second diffraction element diffract image light having a plurality of wavelengths separately. In other words, the first diffraction element and the second diffraction element enable color display.

In a specific aspect, there is included a third diffraction element being interposed between the first diffraction element and the second diffraction element and being configured to guide image light in a direction intersecting with a diffraction direction of the first diffraction element. The third diffraction element has a function of expanding a light beam width of the image light incident on an eye, in the direction intersecting with the diffraction direction of the first diffraction element.

In a specific aspect, there is included a wavelength-limiting filter being arranged in an optical path from the display element to a light emission side of the second diffraction element and being configured to prevent emission of the diffracted light to an external side of the second diffraction element. In this case, the image light having an unintended wavelength can be prevented from being emitted frontward from the second diffraction element and being observed as eye glow.

The stray light suppression filter is a wavelength-limiting filter that prevents emission of the image light to the external side of the second diffraction element.

An optical unit in a specific aspect includes a display element configured to emit image light, a light-guiding member including a first total reflection surface and a second total reflection surface, a first diffraction element being provided on a light incidence side in association with the light-guiding member, a second diffraction element being provided on a light emission side in association with the light-guiding member, and a stray light suppression filter being provided on an external side of an image extraction part provided with the second diffraction element and being configured to limit passage of diffracted light from the second diffraction element.

What is claimed is:

1. A virtual image display device, comprising:
   a display element configured to emit image light;
   a light-guiding member including a first total reflection surface and a second total reflection surface;
   a first diffraction element being provided on a light incidence side in association with the light-guiding member;
   a second diffraction element being provided on a light emission side in association with the light-guiding member; and
   a stray light suppression filter being provided on an external side of an image extraction part provided with the second diffraction element and being configured to limit passage of diffracted light from the second diffraction element.

2. The virtual image display device according to claim 1, wherein
   the stray light suppression filter is an angle-limiting filter including a light shielding part arranged repeatedly at a predetermined interval in a flat plate.

3. The virtual image display device according to claim 1, comprising
   a filter configured to limit passage of diffracted light having a specific wavelength, among diffracted light having a plurality of wavelengths from the second diffraction element.

4. The virtual image display device according to claim 1, wherein
   the stray light suppression filter includes a plurality of filters configured to limit passage of diffracted light of a plurality of orders from the second diffraction element.

5. The virtual image display device according to claim 1, comprising
   a light transmission member having a flat plate shape and being arranged on the external side of the image extraction part, wherein
   the stray light suppression filter is provided on any one of an external side or an eye position side of the light transmission member.

6. The virtual image display device according to claim 5, wherein
   the light transmission member is made of a resin, and the light-guiding member is made of glass.

7. The virtual image display device according to claim 5, wherein
   the stray light suppression filter is provided on each of the external side and the eye position side of the light transmission member.

8. The virtual image display device according to claim 1, wherein the first diffraction element and the second diffraction element diffract image light having a plurality of wavelengths separately.

9. The virtual image display device according to claim 1, comprising:
a third diffraction element being interposed between the first diffraction element and the second diffraction element and being configured to guide image light in a direction intersecting with a diffraction direction of the first diffraction element.

10. The virtual image display device according to claim 1, comprising:
a wavelength-limiting filter being arranged in an optical path from the display element to a light emission side of the second diffraction element and being configured to prevent emission of the diffracted light to an external side of the second diffraction element.

11. The virtual image display device according to claim 1, wherein
the stray light suppression filter is a wavelength-limiting filter that prevents emission of the image light to the external side of the second diffraction element.

12. An optical unit, comprising:
a display element configured to emit image light;
a light-guiding member including a first total reflection surface and a second total reflection surface;
a first diffraction element being provided on a light incidence side in association with the light-guiding member;
a second diffraction element being provided on a light emission side in association with the light-guiding member; and
a stray light suppression filter being provided on an external side of an image extraction part provided with the second diffraction element and being configured to limit passage of diffracted light from the second diffraction element.

* * * * *